US005574612A

United States Patent [19]

Pak

[11] Patent Number: 5,574,612
[45] Date of Patent: Nov. 12, 1996

[54] POWER CONNECTION SYSTEM FOR SERVICE PANEL UTILIZING A QUICK PLUG-IN ELECTRICAL RECEPTACLE

[76] Inventor: Won S. Pak, 31615-C 3rd Pl., SW., Federal Way, Wash. 98023

[21] Appl. No.: 340,071

[22] Filed: Nov. 15, 1994

[51] Int. Cl.[6] ............................................. H02H 3/00
[52] U.S. Cl. ........................... 361/93; 361/115; 361/636; 361/652
[58] Field of Search ............................... 361/118, 93, 42, 361/38, 115, 633, 636, 641, 652, 656; 439/215

[56] References Cited

U.S. PATENT DOCUMENTS

| | | | |
|---|---|---|---|
| 2,910,630 | 10/1959 | Hammerly | 361/636 |
| 3,120,628 | 2/1964 | Edmunds | 361/635 |
| 3,280,379 | 10/1966 | Ellsworth et al. | 317/119 |
| 3,463,967 | 8/1969 | Klein | 361/363 |
| 3,716,651 | 2/1973 | Werner | 174/53 |
| 3,743,891 | 7/1973 | Buxton | 317/119 |
| 3,922,586 | 11/1975 | Buxton et al. | 317/112 |
| 4,117,285 | 9/1978 | Harper | 200/76 |
| 4,157,582 | 6/1979 | Myers | 361/353 |
| 4,485,282 | 11/1984 | Lee | 200/51 R |
| 4,642,733 | 2/1987 | Schacht | 361/363 |
| 5,203,711 | 4/1993 | Bogiel | 439/215 |
| 5,203,712 | 4/1993 | Kilpatrick et al. | 439/215 |
| 5,203,713 | 4/1993 | French et al. | 439/215 |

OTHER PUBLICATIONS

"Hubbell/Nema Configurations" published by Harvey Hubbell Incorporated of Bridgeport, Connecticut (undated, but before Nov. 1994).

"I-T-E® and Other Siemens Electrical Products/Spped Fax 1987-88," a product catalog published by Siemens AG based in Munich, Germany, p. 114.

"Digest 166, Electrical and Advanced Technology Products" a product catalog published by Square D Company of Palatine, Illinois, p. 24 (Mar. 1987).

Primary Examiner—Jeffrey A. Gaffin
Assistant Examiner—Stephen W. Jackson
Attorney, Agent, or Firm—Chernoff, Vilhauer, McClung & Stenzel

[57] ABSTRACT

An electrical receptacle directly mounts on a conventional service panel to adapt the panel for electrical connection with a standard power cord. The receptacle has an insulative housing and includes one or more lower spring contacts, two or more upper spring contacts and a rear contact. One or more lip members on the rear end of the housing are inserted beneath the panel's hook-like retaining tabs, and each lower spring contact is thereafter pivoted into wiping engagement with one of the blades on the panel that serve as power terminals. The respective prongs of the power cord are inserted through openings on the upper face of the receptacle for wiping engagement with the upper spring contacts. At least one of the prongs is thus connected electrically to a corresponding blade on the panel via an interconnected upper spring contact and lower spring contact or, alternatively, via an interconnected upper spring contact and rear contact, which rear contact is tied to the load end of a selected circuit breaker module by an interconnecting cable. In one preferred construction, a connection path that reverses back upon itself and that includes an overload protection device interconnects each rear contact with an upper spring contact. At least one other prong is connected electrically to a ground bus on the panel via an interconnected upper spring contact and rear contact, which rear contact is tied to the bus by a cable.

22 Claims, 8 Drawing Sheets

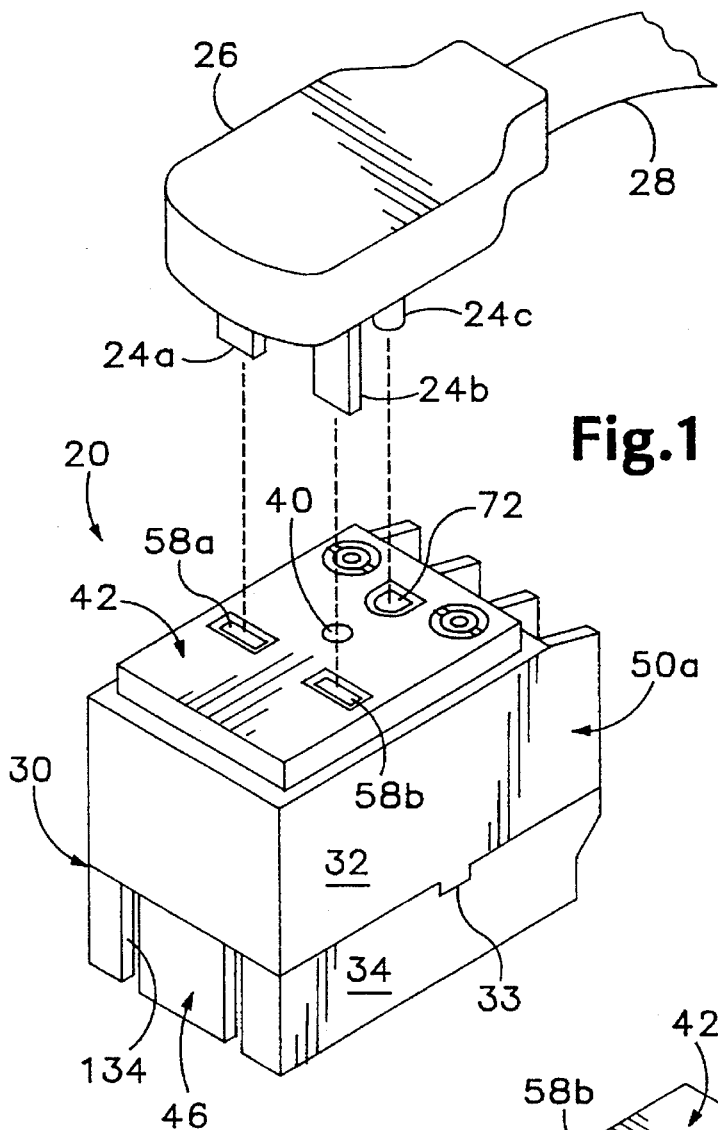
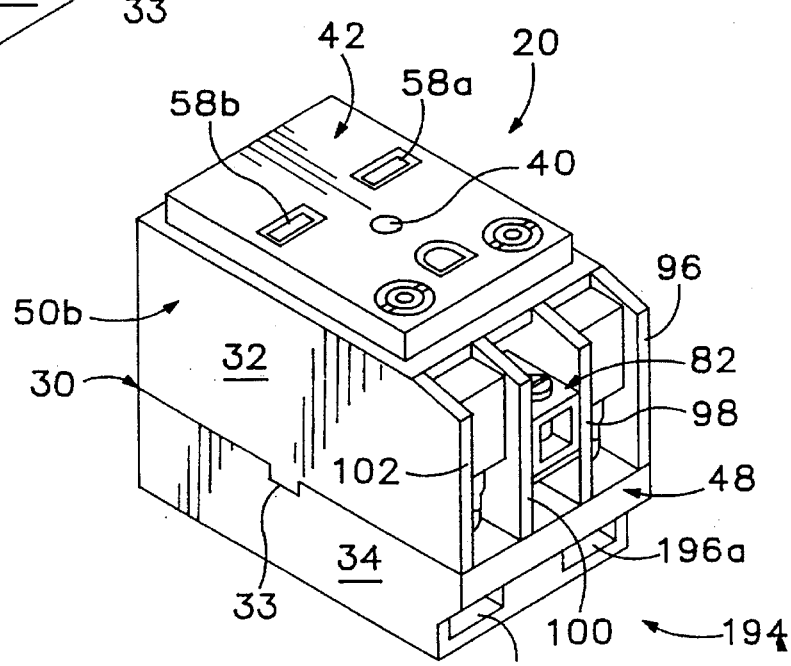
Fig.1
Fig.2

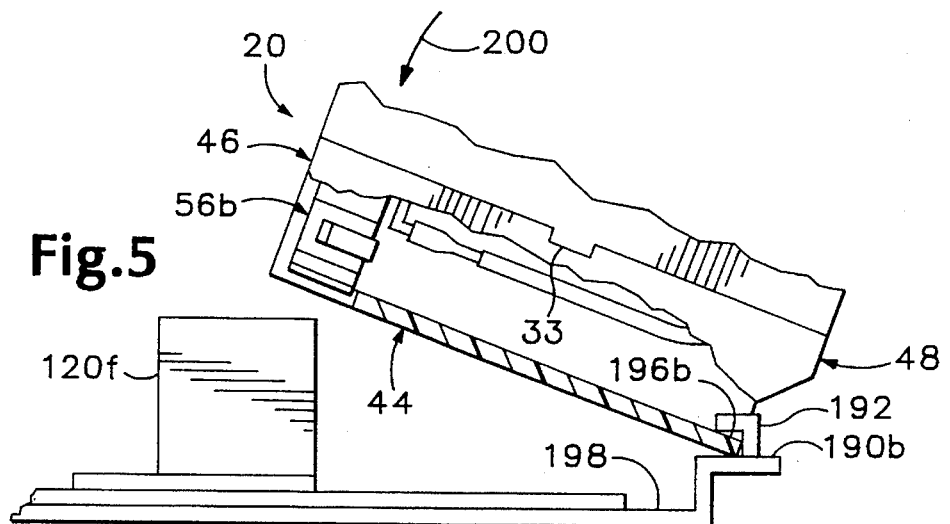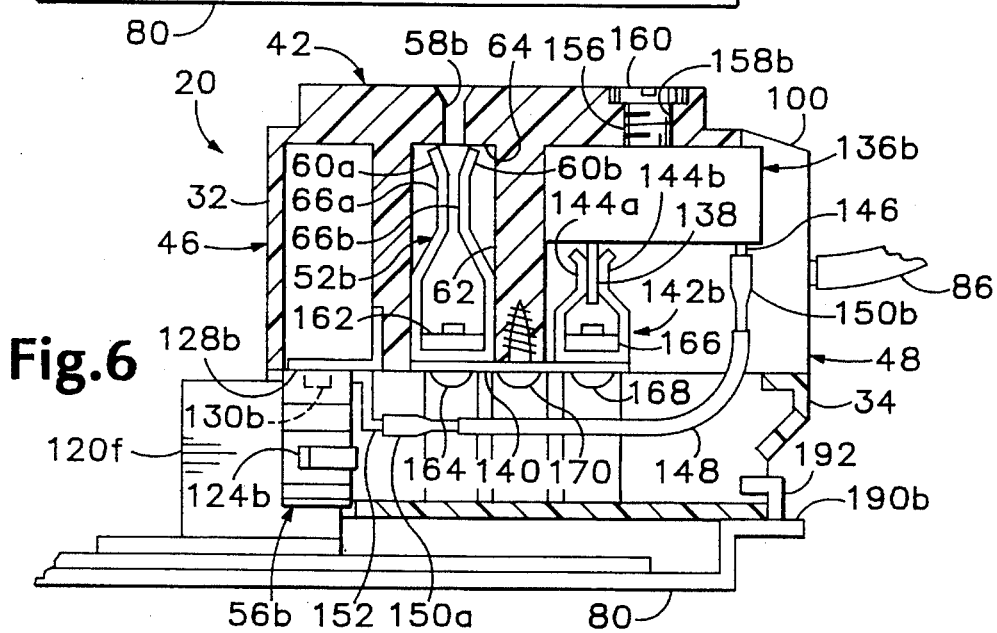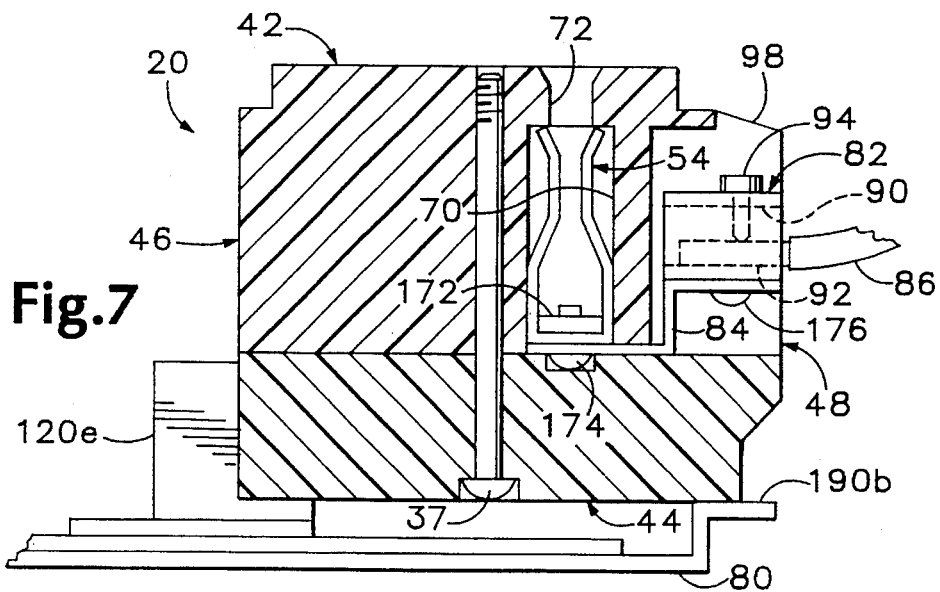

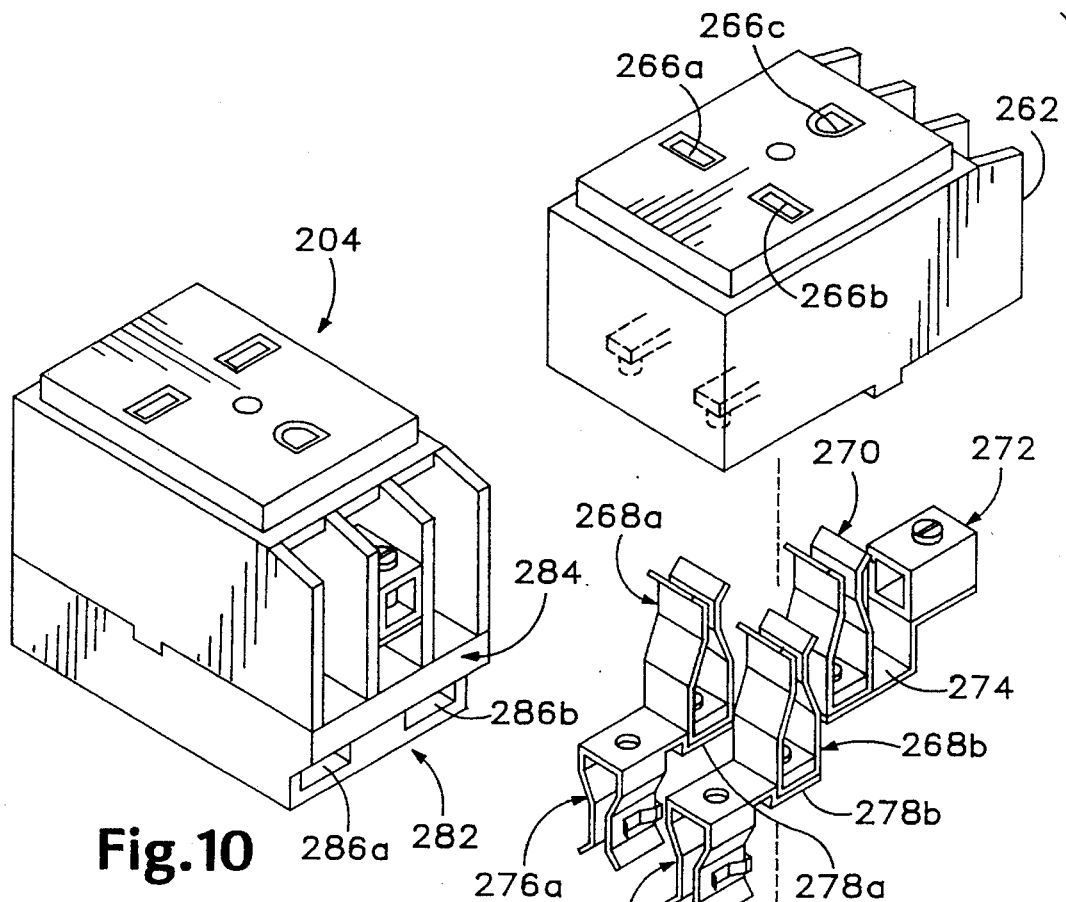
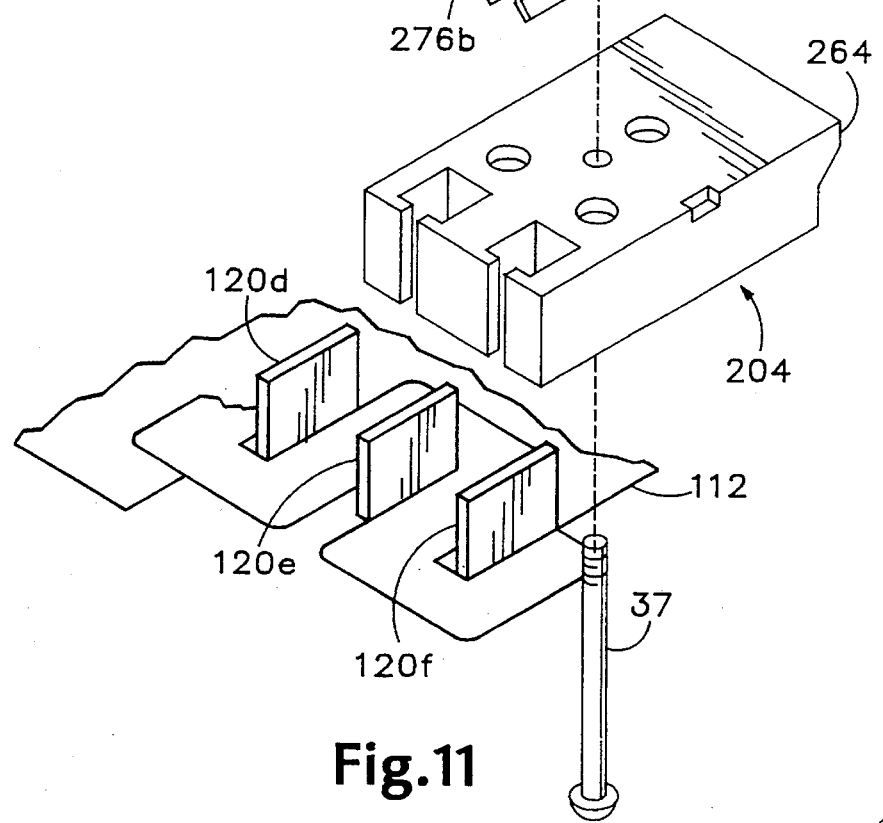
Fig.10
Fig.11

POWER CONNECTION SYSTEM FOR SERVICE PANEL UTILIZING A QUICK PLUG-IN ELECTRICAL RECEPTACLE

BACKGROUND OF THE INVENTION

The present invention relates to a system for flexibly adapting a service panel of conventional type for connection with a power cord, which cord can be one of several standard types, each type having a characteristic prong arrangement on its plug-in head portion. The present invention relates, in particular, to a system utilizing an electrical receptacle that is suitably configured for quick plug-in mounting on the service panel and that provides upper contacts suitably arranged for direct engagement by the prongs of the power cord.

In electrical wiring systems generally, a service panel provides a centralized site for redistributing power to secondary supply lines. One or more devices, such as circuit breakers, are normally mounted in predetermined locations on the panel both to provide automatic surge protection relative to the secondary lines and to allow manual cutoff of power to these lines for safety reasons during servicing of the system.

In modern panels of conventional design, a power distribution board is normally provided from the surface of which a linear array of conductive blades upwardly stand so that each blade is in parallel relationship to the others. These blades serve as the power terminals for the board. The board is normally mounted in centered position on a wider mounting bracket, which bracket provides, on either side of each blade, at least one hook-like retaining tab. This tab is designed to received a lip member of the type normally provided on the rearward end of a standard circuit breaker module so as to permit the rearward end of such module to be pivoted about the tab in order to rotate a female-type terminal on the forward end of the module into engagement with the corresponding blade. This type of installation procedure is described in further detail in Hammerly U.S. Pat. No. 2,910,630 and in Edmunds U.S. Pat. No. 3,120,628, and a similar procedure used for installing a surge-protector module is described in Schacht U.S. Pat. No. 4,642,733.

As described in Klein U.S. Pat. No. 3,463,967 and in Myers U.S. Pat. No. 4,157,582, circuit breaker modules are available in both full- and half-width sizes, so that each blade can be engaged by as many as four circuit breaker modules at one time with one module abutting each quadrant of the blade. In place of blade-like power terminals, it is also conventional to use socket-like power terminals, in which case male-type contacts are provided on the circuit breaker module, as shown in Harper U.S. Pat. No. 4,117,285.

Between the line terminal on its forward end and a corresponding load terminal on its rearward end, each circuit breaker module provides an automatic trip mechanism so that any secondary supply line connected to the load terminal is protected against electrical surges. A manual throw switch is also normally provided on each module to reset the automatic trip mechanism and to allow manual cutoff of power to the corresponding secondary supply line.

In some instances, the secondary supply lines terminate at electrical outlets which, because of their location, type or number, are unable to provide an adequate interface for every power cord requiring connection to the system, particularly when the number of users of the system tends to fluctuate, such as at mobile home parks, trailer parks, boat docks and marinas. To sufficiently serve the needs of all users at such facilities, one approach has been to construct temporary hookups by running additional lines from the primary service panel to auxiliary electrical panels or boxes that have been specifically equipped with power outlets or receptacles of a kind compatible with the type of power cords requiring hookup. Two different types of auxiliary service panels are shown in "I-T-E® and Other Siemens Electrical Products/Speed Fax 1987–88," a product catalog published by Siemens AG based in Munich, Germany, p.114, and in "Digest 166, Electrical and Advanced Technology Products" a product catalog published by Square D Company of Palatine, Ill., p.24 (March 1987). The difficulty of this approach, however, is that technically skilled and highly-paid personnel need to be on hand to construct these types of system additions, particularly if the resulting connections and load ratings are to properly comply with electrical code requirements. Furthermore, there may be no suitable installation sites available at locations removed from the primary service panel for mounting additional electrical panels or boxes.

A second approach that has been proposed is to use a specially constructed panel in which only certain mounting locations on the panel are designed to receive standard-size circuit breaker modules, with the remaining mounting locations being modified so that each can mount a corresponding plug-in receptacle module of nonstandard design. Each receptacle module, in turn, can be directly engaged by one of the power cords requiring connection. This approach is described, for example, in Buxton U.S. Pat. No. 3,743,891 with further modifications being described in Buxton et al., U.S. Pat. No. 3,922,586. As described in these references, the plug-in receptacle module includes a circuit breaker section that is quite similar in overall size and function to a side-to-side pair of full-size standard circuit breaker modules. This circuit breaker section is coupled in end-to-end arrangement with an electrical receptacle section so as to enable both sections to be contained within a single housing. In accordance with this construction, the plug-in receptacle module has a total length somewhat exceeding twice that of a standard circuit breaker module.

There are, however, several difficulties with the approach just described. As a preliminary matter, a large investment of time and effort is needed to convert existing systems to this approach. For example, each line that is already connected to the existing panel, if it is to be maintained, needs to be disconnected and then reconnected to the specially constructed panel, which process can involve reconnection of a number of different power and ground cables. Moreover, after the specially constructed panel is in place, the capacity of the underlying system to support the type of connections that are actually needed, can, in fact, be diminished, since only a percentage of the mounting locations provided by the specially constructed panel are available for connections involving standard circuit breaker modules whether or not the remaining mounting locations are being used for connections involving plug-in receptacle modules. Furthermore, in order to provide sufficient clearance within the specially constructed panel to accommodate the oversized plug-in receptacle modules, the overall physical arrangement of the various major components of this panel is significantly altered from that of a standard panel. The resulting arrangement is such that even if every mounting location of the panel was able to mount a standard circuit breaker module, there would still be a problem of underutilization of panel space. In contrast with a conventional panel, for example, it is not possible to mount standard circuit breaker modules on the specially constructed panel in a spatially efficient two-ranked array so as to make efficient use of both sides of the linear sequence of power-supplying blades.

Accordingly, an object of the present invention is to provide an improved system for adapting a service panel for temporary connection to one or more power cords.

A related object of the present invention is to provide a system of the above general type which can be readily utilized in conjunction with service panels of conventional type.

Another related object of the present invention is to provide a system of the above general type in which laborious substitution of the existing service panel with an entirely new panel is not required.

Yet another related object of the present invention is to provide a system of the above general type in which the service panel can be fully utilized whether the type of connections needed are entirely of the type requiring a circuit breaker module or entirely of the type requiring an electrical outlet.

Still another related object of the present invention is to provide a system of the above general type which permits efficient utilization of the space within the service panel.

SUMMARY OF THE PRESENT INVENTION

To achieve the aforementioned objects, the present invention utilizes an electrical receptacle that is suitably configured for quick plug-in mounting on a conventional service panel in the same manner as a standard circuit breaker module. This receptacle provides upper contacts that are suitably arranged for direct engagement by the prongs of the power cord requiring connection.

In a first aspect of the present invention, an electrical receptacle is provided having an upper face in which are formed at least first and second openings so that at least first and second prongs on the power cord can be inserted into these openings for engagement with at least first and second upper spring contacts included on the receptacle. A mounting mechanism is provided on the receptacle that includes a lower contact disposed along the lower face of the receptacle adjacent the front end thereof in suitable orientation for plug-in engagement with one of the power terminals of the panel. The mounting mechanism is configured so that the receptacle is mountable on the panel in substitution for a circuit breaker module of standard length and includes an attachment mechanism for keeping the rear end of the receptacle and the retaining tab located on the mounting support of the panel inseparably attached to each other in direct response to plug-in engagement between the lower contact and the power terminal. In accordance with this aspect, the receptacle can be mounted in secure position on a conventional panel of the type adapted to mount a circuit breaker module of standard length without any special modifications being made to the mounting bracket of the panel.

In a second aspect of the present invention, a method is provided for adapting a power distribution panel for electrical connection with a power cord. The method includes providing an electrical receptacle having an upper face in which are formed at least first and second openings through which at least first and second prongs of the power cord can be inserted for mating engagement with first and second upper spring contacts on the receptacle. The method further includes providing a mounting mechanism on the receptacle that includes a lower contact disposed along the lower face of the receptacle adjacent the front end thereof in suitable orientation for plug-in engagement with one of the power terminals on the panel. The method further includes providing a lip member on the rear end of the receptacle and directly mounting the receptacle on the panel by inserting the lip member beneath the hook-like retaining tab on the mounting support and then pivoting the lip member about the retaining tab so as to cause the lower contact to rotate into plug-in engagement with the blade. In accordance with this aspect, the panel can be adapted for electrical connection to a power cord by mounting the described receptacle on the panel in the same convenient manner in which a standard circuit breaker module is mounted on the panel.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of an exemplary electrical receptacle constructed in accordance with the present invention and further depicts in fragmentary perspective view the plug-in head portion of a standard power cord having prongs in suitable arrangement for connection to the receptacle by insertion therewithin along the dashed lines indicated.

FIG. 2 is a perspective view of the electrical receptacle of FIG. 1 but from a different viewing angle.

FIG. 5 shows a fragmentary side view of the lower portion of the electrical receptacle of FIG. 1 with portions removed to reveal interior details and further shows how this portion is mounted by pivoting movement on the service panel of FIG. 4, certain portions of which panel are shown in side elevational view.

FIG. 6 is a sectional view of the electrical receptacle taken along lines 6—6 in FIG. 4 where the portions of the service panel on which the receptacle is mounted are shown in side elevational view.

FIG. 7 is a sectional view of the electrical receptacle taken along lines 7—7 in FIG. 4 where the portions of the service panel on which the receptacle is mounted are shown in side elevational view.

FIG. 10 is a perspective view of a second alternative embodiment of the electrical receptacle as constructed in accordance with the present invention.

FIG. 11 is an exploded perspective view of the receptacle shown in FIG. 10.

DETAILED DESCRIPTION OF THE PREFERRED EMBODIMENTS

Figure 4:
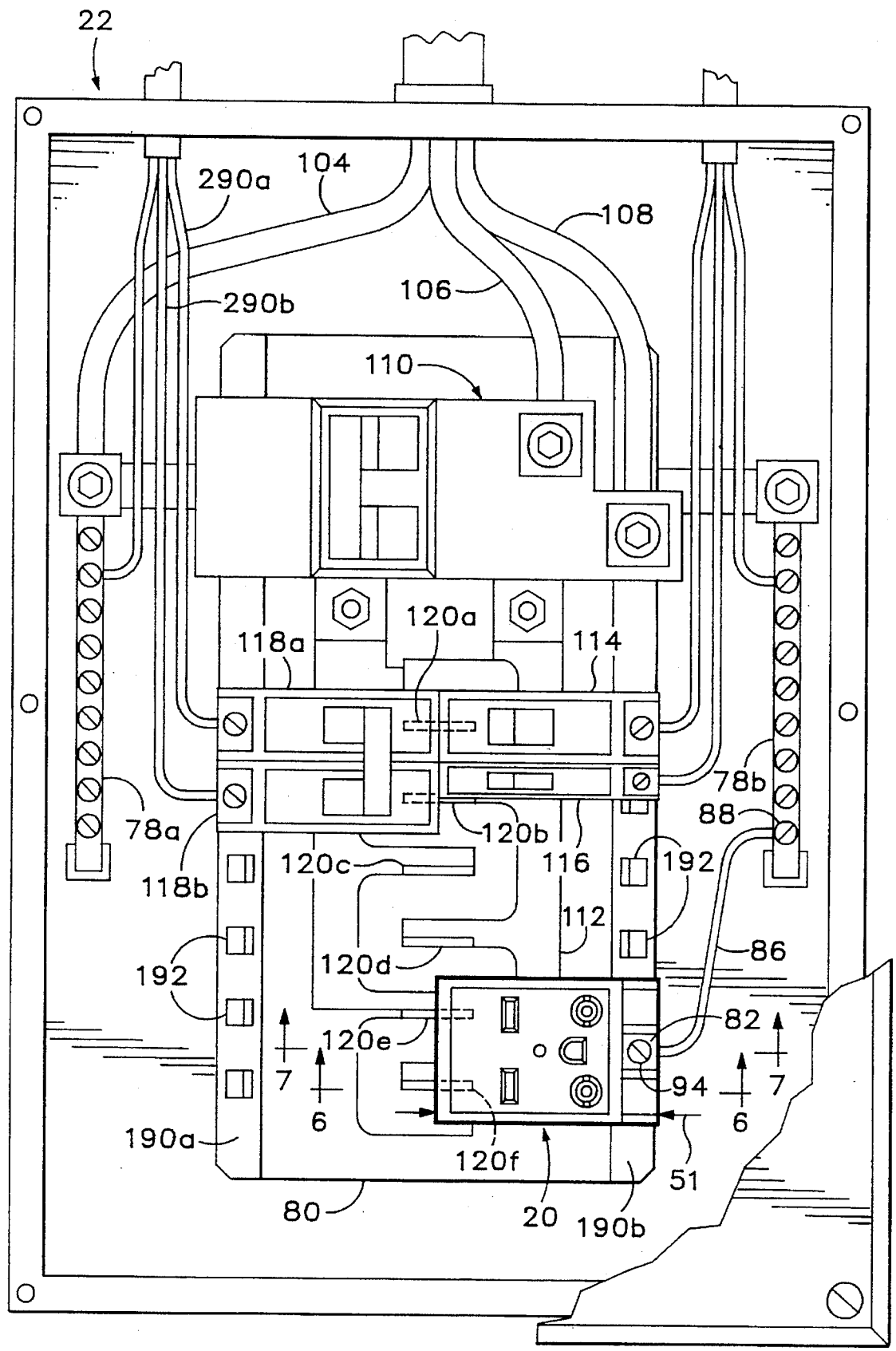
FIG. 4 is a plan view showing, in heavily darkened lines, the electrical receptacle of FIG. 1 and indicating how such receptacle is mounted on a conventional electrical service panel.

FIGS. 1 and 2 show different perspective views of an exemplary electrical receptacle 20 constructed in accordance with the present invention. Referring also to FIG. 4, this receptacle is designed to be mounted on a conventional service panel 22 in such a manner that no special modifications are needed to the panel in order to mount the receptacle thereon. In its mounted position, the receptacle serves as an adapter by means of which a standard power cord can be temporarily connected to the electrical system through the service panel without any need, for example, to install additional electrical panels or boxes of customized configuration to enable such connection.

Referring to FIG. 1, the exemplary receptacle 20 shown is suitably configured for making connection to the different prongs 24a, b and c that extend from the plug-in head portion 26 of a two-pole, three-wire power cord 28 of standard 250-volt, 30-ampere type. Alternatively, the exemplary receptacle can be configured for connection with other standard types of power cords that have fewer or greater numbers of poles or wires and/or lower or higher voltage/current ratings. It is possible, in other words, to match the configuration of the exemplary receptacle to the type of power cord that requires hookup to the system. This will become clearer from the detailed description of the receptacle that follows.

Some of the different types of prong configurations for which the exemplary receptacle 20 can be adapted are suggested by a table of plug/receptacle configurations labeled "Hubbell/Nema Configurations" published by Harvey Hubbell Incorporated of Bridgeport, Conn. (undated), a copy of which publication is submitted herewith to the U.S. Patent Office and which publication is hereby expressly incorporated herein by reference. As this publication suggests, the exemplary receptacle can be adapted for connection to power cords that have locking-type prong configurations as well as those that have nonlocking-type prong configurations. As the publication further suggests, the prong configuration of the power cord will also vary depending on the current or voltage rating of the cord. Accordingly, the configuration of the openings and conductive elements in the exemplary receptacle 20 are selected so as to correspond with the type of power cord that is to be used.

As listed in the Hubbell publication, typical current ratings are 15 Amp., 20 Amp., 30 Amp., 50 Amp. and 60 Amp. for general-purpose nonlocking plugs and receptacles. For locking-type plugs and receptacles, typical current ratings are 15 Amp., 20 Amp., and 30 Amp. With respect to their voltage ratings, both nonlocking and locking type plugs and receptacles are available with the same rating. Typical voltage ratings for a 2-pole, 2 wire device are 125 V, 250 V, 277 V a.c., or 600 V. For a 2-pole, 3-wire grounded device, typical ratings are 125 V, 250 V, 277 V a.c., 480 V, or 600 V. For a 3-pole, 3-wire device (special applications only), typical ratings are 125/250 V, 250 V (3-phase), 480 V (3-phase), or 600 V (3-phase). For a 3-pole, 4-wire grounded device, typical ratings are 125/250 V, 250 V (3-phase), 480 V (3-phase) or 600 V (3-phase). For a 4-pole, 4-wire device (special applications only), typical ratings are 120/208 V (3-phase, Y), 277/480 V (3-phase, Y), or 347/600 V (3-phase, Y). For a 4-pole, 5-wire grounded device typical ratings are 120/208 V (3-phase Y), 277/480 V (3-phase, Y), or 347/600 V (3-phase, Y). These ratings are representative and indicate the wide variety of different configurations which the exemplary receptacle 20 can assume.

Figure 3:
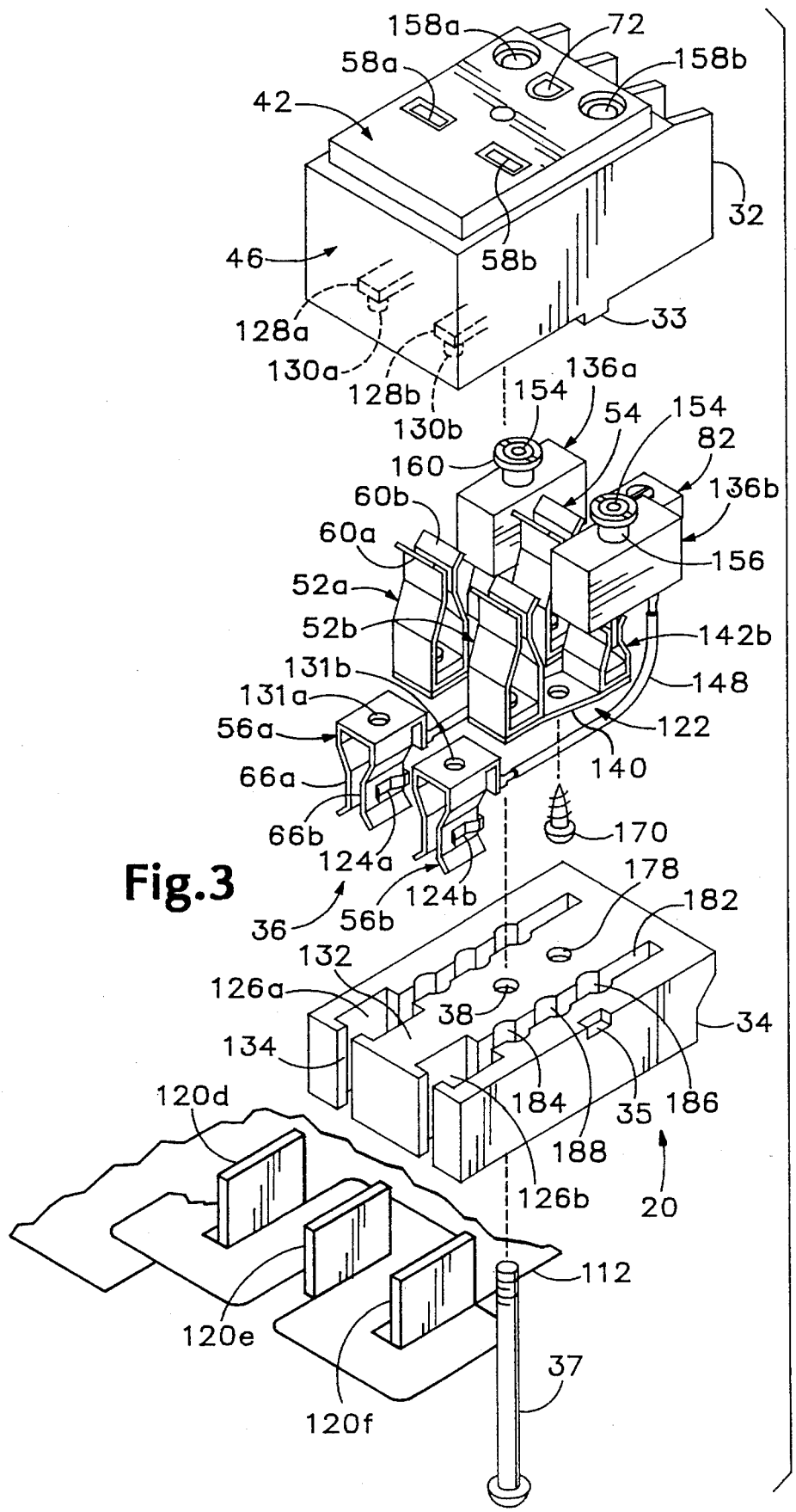
FIG. 3 shows an exploded perspective view of the electrical receptacle of FIG. 1 that illustrates how the receptacle is assembled and also shows in heavily darkened lines a fragmentary perspective view of the blade assembly of a conventional service panel on which the electrical receptacle is mounted.

Referring to FIGS. 1–2, the exemplary receptacle 20 includes an insulative outer housing 30. Referring also to FIG. 3, the insulative outer housing is composed of two halves that include an upper insulative casing 32 and a lower insulative casing 34. A pair of keys 33 on the upper insulative casing register with a corresponding pair of slots 35 formed on the lower insulative casing so that these halves of the casing fit together in proper relative alignment during assembly. These two halves enclose the internal components of the receptacle, which components include a plurality of conductive elements 36 that enable the receptacle to establish electrical connection between the service panel 22 (FIG. 4) and the power cord 28. The upper and lower casings 32 and 34 are held together by a central screw 37 which, after being passed through a central hole 38 in the lower casing, is threadably fastened to the interior threads of a corresponding central hole 40 formed in the upper casing. When fully assembled, the insulative outer housing 30 has a shape that is generally box-like. In particular, the assembled housing has an upper face 42, lower face 44 (FIG. 5), front end 46, rear end 48, and pair of sides 50a, b.

As shown in FIG. 3, the plurality of conductive elements 36 include respective right- and left-hand upper spring contacts 52a and 52b, a rearward upper spring contact 54 and respective right- and left-hand lower springs contacts 56a and 56b, where each contact includes a spring-biased pair of jaws. Referring also to FIG. 1, the respective right- and left-hand upper springs contacts 52a and 52b are so mounted within the receptacle as to be disposed in alignment with right- and left-hand openings 58a and 58b, respectively, that are formed on the upper face 42 of the receptacle. Thus, when the forward or power-connecting prongs 24a and 24b of the power cord 28 are inserted through the openings 58a and 58b, these prongs are engaged by the spring contacts 52a and 52b, respectively.

As indicated in FIG. 3, each contact 52a, 52b, 54, 56a and 56b has a pair of diverging lips 60a and 60b. Referring also to FIG. 6, each contact, such as contact 52b, is inserted into a corresponding cavity, such as cavity 62, that is formed in either the upper casing 32 or the lower casing 34 to hold that particular contact. In cooperation with the corresponding cavity, the diverging lips of each contact help to seat the contact at the proper level within the receptacle by abutting an inwardly facing ledge, such as 64, formed at the outward end of each cavity. The diverging lips of each contact also help to center the inserted element, be it a prong or a blade, relative to the contact so that the inserted element passes between and is wipingly engaged by the flat contact portions 66a and 66b (FIGS. 3 and 6) of the contact. This wiping-type engagement clears the surface oxides off the respective conductive surfaces of both the contact and the inserted element so that reliable electrical connection occurs therebetween.

Referring to FIGS. 3 and 7, the rearward upper spring contact 54 is mounted within a cavity 70 formed in the upper casing 32 so as to be disposed in alignment with a rearward opening 72 that is formed on the upper face 42 of the receptacle. Thus, referring also to FIG. 1, when the rearward or ground-connecting prong 24c of the power cord 28 is inserted through opening 72, this prong is engaged by the rearward upper spring contact. Included on the receptacle is a mechanism that enables the rearward upper spring contact to be connected electrically in a flexible manner to the grounding bus of the service panel on which the receptacle is mounted. With respect to the service panel shown in FIG. 4, a pair of interconnected grounding buses or bars 78a and 78b are provided, one on each side of the panel's central mounting support or bracket 80. To enable connection of the rearward upper spring contact 54 with a selected one of these bars, the receptacle includes a rear contact 82 that is accessible from the rear end 48 of the receptacle and that is interconnected to the rearward upper spring contact by a rigid conductive strap 84, as best seen in FIG. 7. This rear contact is adapted to receive the end of a cable 86 so that when the other end of the cable is connected to the selected grounding bar, as by a set screw 88 on the bar, the rearward upper spring contact 54 is connected to panel ground.

It will be recognized that the connection method just described enables a ground connection to be established between the receptacle 20 and the service panel 22 even though, as a practical matter, each grounding bus 78a and 78b generally lies in an arbitrary position relative to the possible mounting locations of the receptacle on the mounting bracket 80. In other words, even though the distance between the mounted receptacle and the grounding bus can vary, such variance is easily compensated for by proper selection of the length of the interconnecting cable 86. It will also be noted that the rear contact 82 is so configured as to be connectable with various cables of different gauge so as to be compatible with whatever size cable is available. The rear contact, in particular, forms a chamber 90 into which the end 92 of the cable can be loosely inserted, as indicated in dashed lines in FIG. 7. Referring to FIGS. 3 and 7 together, a set screw 94 is threadably mounted on the rear contact so that its end portion enters the chamber. Accordingly, by turning the set screw in the proper direction, the depth of entry of the screw's end portion into the chamber can be adjusted so that cables of different gauge can be forcibly connected electrically to the chamber by the screw. A plurality of insulative dividing walls 96, 98, 100 and 102 formed on the rear end 48 of the receptacle, as shown in FIG. 2, extend above the rear contact and thereby lessen the risk of inadvertent shorts occurring through the contact.

FIG. 4 illustrates a typical service panel 22 of conventional type. By way of background, there are three primary lines that feed into the panel from an outside service entrance. These primary lines include a ground line 104, a first power line 106 (carrying 120 volts, positive phase) and a second power line 108 (carrying 120 volts, negative phase). Within the panel, the ground line 104 is connected to the grounding bars 78a and 78b which, in turn, are connected to the receptacle 20 in the manner already described. The first and second power lines 106 and 108, on the other hand, are routed to a manually-switchable main circuit breaker module 110 which controls power to the entire electrical system downstream of the panel.

From the main circuit breaker module 110, a power distribution board 112 serves to distribute the power carried by the respective power lines 106 and 108 to individual devices mounted on the mounting bracket 80 of the panel. These individual devices, as indicated, can include one or more of the following: a full-size circuit breaker module 114, a half-size circuit breaker module 116 or a pair of full-size circuit breaker modules 118a and 118b that have their manual switches ganged together for simultaneous operation. Referring also to FIG. 3, one or more lower contacts at the line or forward end of each device is engaged to one or more of the upstanding blades 120a–f that serve as the power terminals for the power distribution board. These blades are arranged in linear sequence with their sides in spaced-apart parallel relationship to each other and are alternately connected to different ones of the power lines. Thus, in one possible connection sequence, blades 120a, c and e are connected through the main breaker module 110 to the first power line 106 (carrying the positive phase voltage) whereas blades 120b, d and f are connected through the main breaker module to the second power line 108 (carrying the negative phase voltage). The elements and combinations just identified are conventional and are only described in order to clarify the type of environment in which the exemplary receptacle 20 operates.

Referring to FIGS. 3 and 4, the right- and left-hand lower spring contacts 56a and 56b enable the front end 46 of the receptacle 20 to be mounted by quick plug-in action on the power distribution board 112 because such contacts are disposed along the lower face 44 (FIG. 5) of the receptacle adjacent this front end in suitable orientation for wiping engagement with respective ones of the upstanding blades (such as 120e and 120f). It will be noted that the power terminals may conventionally be in some form other than blades, such as female-type sockets, in which case the corresponding lower contacts 56a and 56b are adapted accordingly, such as by configuring them as male-type prongs.

Referring also to FIG. 1, in addition to enabling quick attachment of the receptacle's front end 46, the lower spring contacts 56a and 56b further enable electrical connection to be established between the power cord 28 and the power distribution board. This is so because the right- and left-hand lower spring contacts 56a and 56b are interconnected electrically with the right- and left-hand upper spring contacts 52a and 52b, respectively, which interconnection occurs through an interconnection circuit 122. Accordingly, each forward prong 24a and 24b is electrically connectable with a respective one of the blades through the corresponding lower spring contact 56a or 56b. The reliability of such electrical connection is enhanced by the wiping engagement that occurs between each lower spring contact and the selected blade since surface oxides are cleared away from the respective mating surfaces of the contact and blade during this type of engagement.

The electrical reliability of the connection just described is further increased by a generally U-shaped spring clip. One such clip 124a or 124b is fitted over the flat contact portions 66a and 66b (FIG. 3) of each lower spring contact, thereby causing a greater interconnect force to be developed between these contact portions and the selected blade. Also, because the spring clip causes the flat contact portions to more tightly grip the selected blade, the front end 46 of the receptacle is more securely mounted on the service panel.

As shown in FIG. 3, lower cavities 126a and 126b are formed within the lower casing 34 of the receptacle for receiving the right- and left-hand lower spring contacts 56a and 56b, respectively. Referring also to FIG. 6, in order to prevent each contact from moving in a loose manner within its respective cavity, the upper casing 32 provides a pair of surfaces 128a and 128b from each of which downwardly projects a round lug 130a or 130b. During assembly of the receptacle, each surface 128a and 128b is brought into face-to-face abutment with the flat center portion of the corresponding lower spring contact, and the corresponding round lug 130a or 130b is inserted into the hole 131a or 131b which is defined in that flat central portion. Thus, the position of each contact is prevented from shifting inside the cavity even when the contact is acted on by substantial interconnect forces.

An insulative dividing wall 132 separates the respective lower cavities 126a and 126b so as to prevent arching or other shorts from occurring between the lower spring contacts 56a and 56b while they are connected electrically to the blades. Each lower cavity 126a and 126b opens toward the forward end 46 of the receptacle through a narrow slit 134. Thus, as shown in FIGS. 4 and 6, only a half portion of each blade needs to lie within the receptacle in order for electrical power connections to be made between the receptacle and the panel. The unused half portion of the blades are available for connection to other devices, such as circuit breaker modules or additional receptacles of the type herein described.

The interconnection circuit 122 has a right-hand branch whereby the lower spring contact 56a is electrically connected to the upper spring contact 52a and a separate left-hand branch whereby the lower spring contact 56b is electrically connected to the upper spring contact 52b. The elements in each of these branches are equivalent, so that any portion of the following description referencing only the left-hand branch will be equally applicable to the right-hand branch and vice versa. Referring to FIG. 3, each branch of the interconnection circuit includes an overload protection device 136a or 136b. Referring also to FIG. 6, the forward terminal 138 of each device is interconnected to the corresponding upper spring contact, such as 52b, by a rigid conductive strap 140 and by an inner spring contact 142a or 142b (142a is not visible in the view shown). Each inner spring contact includes a pair of flat contact portions 144a and 144b for grippingly engaging the forward terminal 138. A rearward terminal 146 provided on each overload protection device is connected electrically to the corresponding lower spring contact, such as 56b, by a jacketed cable 148, which cable is terminated on each end by a male connector 150a or 150b. These connectors enable one end of the cable to be slidable connected matingly to a rear lug 152 provided on the lower spring contact and the other end of the cable to be slidably connected matingly to the rearward terminal.

At normal levels of current, a conductive path within each overload protection device 136a or 136b effectively provides a short between the respective forward and rearward terminals 138 and 146. However, if the level of current passing through the device exceeds a predetermined tolerance rating, this conductive path is automatically opened so that the forward and rearward terminals are disconnected electrically from each other. In order to make the device again operative for normal use, the conductive path is again closed by resetting a manual pressbutton switch 154 that is provided on the device so as to electrically reconnect the forward and rearward terminals. One commercially available protection device of the type that is able to perform the functions hereinabove described is made by Hosiden Company based in Japan and is sold under the trade name BC501 (for the exemplary receptacle shown in FIG. 3 of the drawings, the version of this device having a tolerance rating of 30 amperes is preferably used). However, while a particular form of overload protection device is illustrated in the drawings, it will be understood that there are a variety of other forms of the device that could alternatively be used.

In accordance with a preferred method of making the exemplary receptacle 20, preferably assembly of the receptacle occurs in a predetermined sequence. Referring to FIGS. 3 and 6, preferably each overload protection device 136a and 136b is first attached to the upper casing 32 by inserting an externally threaded sleeve 156 which is provided on each device through a conformably sized mounting hole 158a or 158b formed on the casing and by screwing a ring-shaped nut 160 onto the projecting end of the threaded sleeve so that the device and the upper casing are firmly fastened together. The nut 160 is slotted to provide a holding surface for a screwdriver or other turning device, and the mounting hole 158 is countersunk so that the tightened nut will lie generally flush with the upper face 42 of the receptacle. The pressbutton reset switch 154 movably operates within the sleeve.

Preferably, the next assembly step involves connecting each upper spring contact 52a and 52b to the corresponding protection device 136a or 136b. In preparation for this step, each upper spring contact is connected to the corresponding conductive strap 140 by a nut 162 and screw 164. Similarly, each inner spring contact 142a and 142b is connected to the corresponding strap by a second nut 166 and screw 168. With respect to each side of the receptacle, the corresponding upper spring contact 52a or 52b is next inserted into its cavity 62 and, at the same time, the corresponding inner spring contact 142a or 142b is brought into wiping engagement with the forward terminal 138 of the corresponding protection device 136a or 136b. As a result of this step, each upper spring contact is connected electrically to the forward terminal of the corresponding protection device. In order to maintain this connection, the center portion of each rigid conductive strap is attached to the upper casing by a fastening screw 170.

Referring to FIG. 3, in accordance with the preferred assembly sequence, the rearward upper spring contact 54 and the lower spring contacts 56a and 56b are next installed on the receptacle. Referring also to FIG. 7, the rigid conductive strap 84 that connects the rearward upper spring contact and the rear contact 82 is connected to the rearward upper spring contact by a nut 172 and screw 174, and to the rear contact by only a screw 176 (this screw engages a threaded hole in the chamber 90 of the rear contact). After they have been assembled together in the matter just described, the rearward upper spring contact 54 and the rear contact 82 are placed in suitable position on the lower casing 34 so that, for example, the head of the screw 174 is loosely received within a corresponding clearance hole 178 formed on the lower casing. Referring also to FIG. 6, with respect to the lower spring contacts 56a and 56b, each such contact is interconnected with the rearward terminal 146 of the corresponding overload protection device 136a or 136b by a jacketed cable 148 in the manner previously described. The cavity 70 (FIG. 7) of the upper casing 32 is preferably next positioned in alignment with the rearward upper spring contact 54, and the upper casing 32 is then lowered onto the lower casing 34 in such a manner that each lower spring contact 56a and 56b is received into its corresponding cavity 126a or 126b and each jacketed cable 148 is received into a corresponding channel 182 formed in the lower casing. Also formed in the lower casing are clearance holes 184, 186 and 188 for receiving the heads of the screws 164, 168 and 170, respectively, which screws, as previously noted, are used in connecting the upper spring contacts 52a and 52b to the corresponding inner spring contacts 142a and 142b. Assembly is then completed by fastening the upper and lower casings 32 and 34 securely together using the central screw 37. The central hole 38 in the lowing casing that receives the screw 37 is countersunk along the lower face 44 of the casing so that the head of the screw will lie flush with this lower face as shown in FIG. 7.

Referring to FIGS. 4–6, the central mounting bracket 80 is generally U-shaped in cross section and includes a pair of horizontal side platforms 190a and 190b that extend away from the central recessed area of the bracket. A plurality of upraised tabs 192 of generally hook-like shape are arranged in linear fashion along each side platform in such a manner that each upstanding blade 120a–f is positioned in centered relationship between a pair of these tabs. Each tab, in conjunction with the corresponding blade, enables an individual device, such as a standard full-size circuit breaker module 114, to be mounted by quick plug-in action securely on the bracket. In particular, in accordance with conventional industry design, the rearward or load end of each standard circuit breaker module includes a lip that can be inserted underneath a selected one of the tabs, thereby enabling the module to be pivoted about the tab so that its forward or load end terminal is rotated into plug-in engagement with the corresponding blade. After such engagement, the selected tab automatically retains the rear end of the device on the mounting bracket. The mounting bracket 80 and the hook-like retaining tabs 192 are conventional and are only described herein to enable full appreciation of the manner in which the exemplary receptacle 20 compatibly mounts on service panels of conventional design.

Referring now to FIG. 2, the exemplary receptacle 20 is provided with an attachment mechanism 194 adjacent its rear end 48. Referring also to FIG. 3, in cooperation with the lower spring contacts 56a and 56b, this attachment mechanism enables the receptacle to be securely mounted on the panel 22 in the same quick plug-in manner as a standard circuit breaker module. In particular, the attachment mechanism includes a pair of lip members 196a and 196b that are formed by the lower walls of corresponding openings formed in the lower casing 34. Referring also to FIG. 5, each of these lip members can be inserted beneath a corresponding one of the hook-like retaining tabs 192 while the receptacle 20 is being held at an oblique angle of tilt relative to the flat central portion 198 of the mounting bracket 80. By pivoting each lip member about the corresponding retaining tab, the receptacle can then be rotated, in the direction 200 shown, so as to cause each of the lower spring contacts 56a and 56b to rotate into wiping or plug-in engagement with the corresponding selected blade, such as 120e or 120f. In direct response to plug-in engagement between each lower spring contact and the corresponding blade, the lip members 196a and 196b keep the rear end 48 of the receptacle inseparably attached to the corresponding retaining tabs, thereby stabilizing the position of the rear end relative to such tabs. To describe this feature somewhat differently, as long as each lip member 196a and 196b is in a position underneath a retaining tab, as shown in FIG. 6, the rear end of the receptacle cannot work loose from the mounting bracket 80, provided that the lower spring contacts on the forward end of the receptacle are engaged to selected ones of the blades.

In accordance with the foregoing description, the lower spring contacts 56a and 56b and the lip members 196a and 196b are configured so as to enable the exemplary receptacle 20 to be mounted on the panel 22 in substitution for a circuit breaker module of standard length. In FIG. 4, for example, the receptacle 20 can be mounted on the panel in substitution for circuit breaker module 114 (and, concurrently, in substitution for circuit breaker module 116). Thus, by removing one or more standard circuit breaker modules from a conventional panel, it is possible to clear a space on the panel for mounting the receptacle. Conversely, it is possible to clear a space on the panel for mounting one or more standard circuit breaker modules by removing the receptacle. In accordance, then, with the needs that exist at any given moment, the panel can be fully outfitted either entirely with circuit breaker modules, entirely with receptacles, or with any desired combination of circuit breaker modules and receptacles. This interchangeability feature affords maximum flexibility with respect to the type of connections that can be provided at the panel.

Due to its volumetrically compact configuration, the exemplary receptacle 20 can be substituted for a standard-type circuit breaker module on a conventional service panel without rearrangement of any of the non-device components on the panel in order to clear a space for the receptacle. Referring to FIG. 4, the exemplary receptacle has an end-to-end length 51 that is substantially the same as the standard length of a conventional circuit breaker module, such as module 114. The term "standard length," as used herein and in the claims, is intended to denote a range of 2.5 to 3.5 inches. As further indicated in FIG. 4, the transverse width of the exemplary receptacle substantially conforms to the combined widths of a ganged pair of standard circuit breaker modules, such as modules 118a and 118b. Thus the exemplary receptacle 20 is able to mount on the panel together with other devices so as to accommodate positioning of the devices, including the receptacle, in a spatially efficient two-ranked arrangement on the panel.

Referring to FIG. 3, it will be recognized that the volumetrically compact configuration of the exemplary receptacle 20 is due, at least in part, to the nature of the conductive path between each lower spring contact 56a and 56b and the corresponding upper spring contact 60a or 60b. In particular, the receptacle's compact configuration can be attributed to the space-conserving design of each path wherein each path reverses back upon itself so as to accommodate an overload protection device 136a or 136b therewithin without undue longitudinal extension of the path.

In accordance with the preferred method of using the exemplary receptacle 20, the receptacle 20 is first mounted by quick plug-in action on the central mounting bracket 80 in the manner above described. As a result of this step, the respective right- and left-hand upper spring contacts 52a and 52b are automatically interconnected electrically with the corresponding pair of blades which serve as the power terminals (positive and negative phase) of the panel. The rearward upper spring contact 54 is then electrically interconnected to one of the grounding buses 78a or 78b of the panel by connecting an electrical cable, such as 86, between the rear contact 82 and the selected grounding bus in the manner previously described. After these connections have been made, the prongs 24a, 24b and 24c of the power cord are then inserted through the openings 58a, 58b and 72 of the receptacle, respectively, in order to electrically connect together the panel and the power cord. If, for any reason, the level of current passing through either the right-hand branch or the left-hand branch of the receptacle should begin to exceed a predetermined tolerance rating, then the corresponding overload protection device 136a or 136b will automatically trip, thereby disconnecting the corresponding line of the power cord from the panel. After the conditions leading to the current surge have been diagnosed and corrected, the receptacle is again made operative for use simply by resetting the pressbutton switch 154 of the particular device that tripped.

FIGS. 8–13 show respective first, second and third alternative embodiments 202, 204 and 206 of the receptacle of the present invention. These alternative embodiments are assembled and used in a manner which is similar in many respects to the assembly and use of the exemplary receptacle 20 shown in FIGS. 1–7. Accordingly, in the following description, only the differences between these alternative embodiments and the exemplary receptacle 20 will be emphasized.

Figures 8, 9:
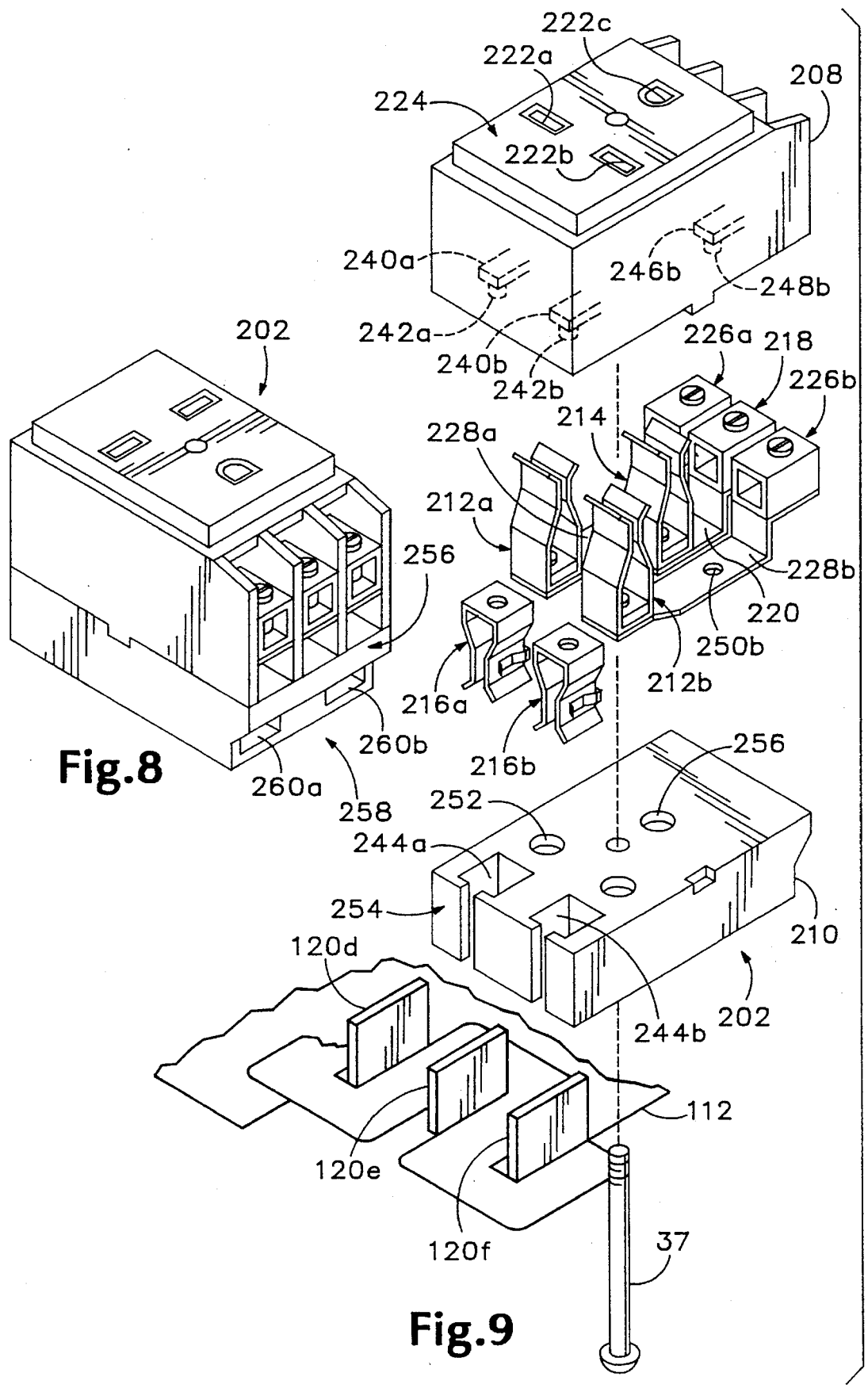
FIG. 8 is a perspective view of a first alternative embodiment of the electrical receptacle as constructed in accordance with the present invention.
FIG. 9 is an exploded perspective view of the receptacle shown in FIG. 8 showing how it is assembled.

As shown in FIG. 9, the first alternative embodiment 202 of the receptacle includes an insulative outer housing that is formed by an upper insulative casing 208 and a lower insulative casing 210. These casings, when assembled, contain a plurality of conductive elements including respective right- and left-hand upper spring contacts 212a and 212b, a rearward upper spring contact 214 and respective right- and left-hand lower springs contacts 216a and 216b. The conductive elements also include a rear contact 218 that is electrically interconnected to the rearward upper spring contact 214 by a rigid conductive strap 220. Respective openings 222a, b and c are formed in the upper face 224 of the upper casing 208 to receive the respective prongs 24a, 24b and 24c of a standard power cord 28 (FIG. 1) so as to enable mating connection between these prongs 24a, 24b and 24c and the upper spring contacts 212a, 212b and 214, respectively. As thus far described, the construction of the first alternative receptacle 202 corresponds to that of the exemplary receptacle 20.

Figure 12:
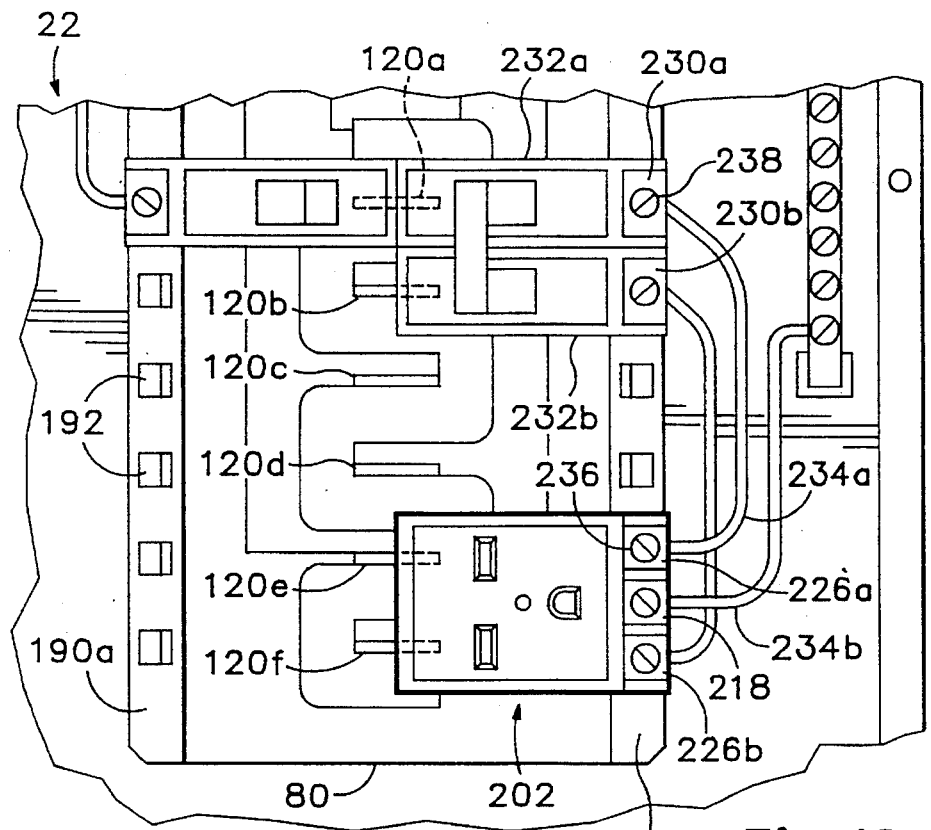
FIG. 12 is a plan view showing, in heavily darkened lines, the embodiment of the electrical receptacle shown in FIG. 8 in its fully installed position on a conventional service panel.

With respect, however, to the manner in which its internal conductive elements 212a, 212b, 216a and 216b connect to each other, the first alternative receptacle 202 significantly differs from the exemplary receptacle 20. With respect to the first alternative receptacle, the right- and left-hand lower spring contacts 216a and 216b are not electrically connected to the corresponding right- and left-hand upper spring contacts 212a or 212b. Instead, each right- and left-hand upper spring contact 212a and 212b is electrically interconnected with a corresponding right- or left-hand rear contact 226a or 226b by a corresponding rigid conductive strap 228a or 228b. Referring also to FIG. 12, in order to electrically connect the first alternative receptacle 202 to selected ones of the power terminals or blades 120a–f of the conventional service panel 22, each right- and left-hand rear contact 226a and 226b is, in turn, preferably interconnected with the load end terminal (e.g., 230a or 230b) of a previously installed standard circuit breaker module (e.g., 232a or 232b) via a respective electrical interconnect cable, such as 234a or 234b. The ends of each interconnect cable are releasably connected to their respective attachment points by set screws. For example, one end of the interconnect cable 234a is releasably connected to the rear contact 226a by a set screw 236 and the other end of the cable is releasably connected to the load end terminal 230a by a set screw 238.

In accordance with the above-identified connections, it will be recognized that the first alternative receptacle 202 shown in FIG. 12 is not directly connected electrically to the respective blades 120e and 120f on which the receptacle is mounted. Instead, the receptacle is indirectly connected electrically to the panel by a pair of blades 120a and 120b that are separate from those on which the receptacle is mounted. Specifically, the right- and left-hand upper spring contacts 212a and 212b are electrically interconnected with blades 120a and 120b, respectively, via circuit breaker modules 232a and 232b, interconnect cables 234a and 234b and rear contacts 226a and 226b, correspondingly. It will further be recognized that in accordance with these connections, if the current flowing between either one of the upper spring contacts 212a or 212b and the corresponding blade 120a or 120b begins to exceed a predetermined tolerance rating, then the corresponding circuit breaker module 232a or 232b will automatically trip and thereby protect the receptacle and its surrounding connections against any damage that might otherwise result from this overload condition. In this manner, then, the first alternative receptacle provides overload protection via its rear contacts 226a and 226b. This is in contrast to the exemplary receptacle 20 which uses protection devices 136a and 136b of a type that are fully integrated on-board the receptacle.

The remaining differences between the first alternative receptacle 202 and the exemplary receptacle 20 are less substantial in character and primarily are a result of the differences already described. Thus, as indicated in FIG. 9, the first alternative receptacle not only includes forward surfaces 240a and 240b and lugs 242a and 242b (which elements cooperate to hold the respective lower spring contacts 216a and 216b fixedly in place within their respective holding cavities 244a and 244b), but also includes rearward surfaces 246a and 246b and lugs 248a and 248b, which elements assist in maintaining the rigid conductive straps 228a and 228b in respective fixed positions inside the receptacle (elements 246a and 248a are not visible in the view shown). To achieve this result, the lugs 248a and 248b are inserted through corresponding openings, such as 250b, that are formed on the straps. As contrasted with the exemplary receptacle 20, the first alternative receptacle includes fewer openings 222a, b and c on its upper face and fewer clearance holes 252, 254 and 256 on its lower casing. Each of these holes provide clearance for the head of a corresponding attachment screw (not shown) that acts in cooperation with a corresponding nut to attach a respective one of the upper spring contacts 212a, 212b or 214 to a corresponding one of the rigid conductive straps 228a, 228b or 220.

Referring to FIGS. 8 and 9 together, the first alternative receptacle 202 provides the same type of mounting mechanism as the exemplary receptacle 20 to enable mounting of the receptacle on the service panel. In particular, the lower spring contacts 216a and 216b enable the front end 254 of the first alternative receptacle to be mounted on the panel due to their suitable orientation for plug-in engagement with a selected pair of the blades that are on the panel. In addition, at the rear end 256 of the first alternative receptacle, an attachment mechanism 258 is provided that includes two lip members 260a and 260b. These lip members enable secure mounting of the rear end by the same type of quick plug-in action previously described in connection with equivalent lip members on the exemplary receptacle 20.

Figure 13:
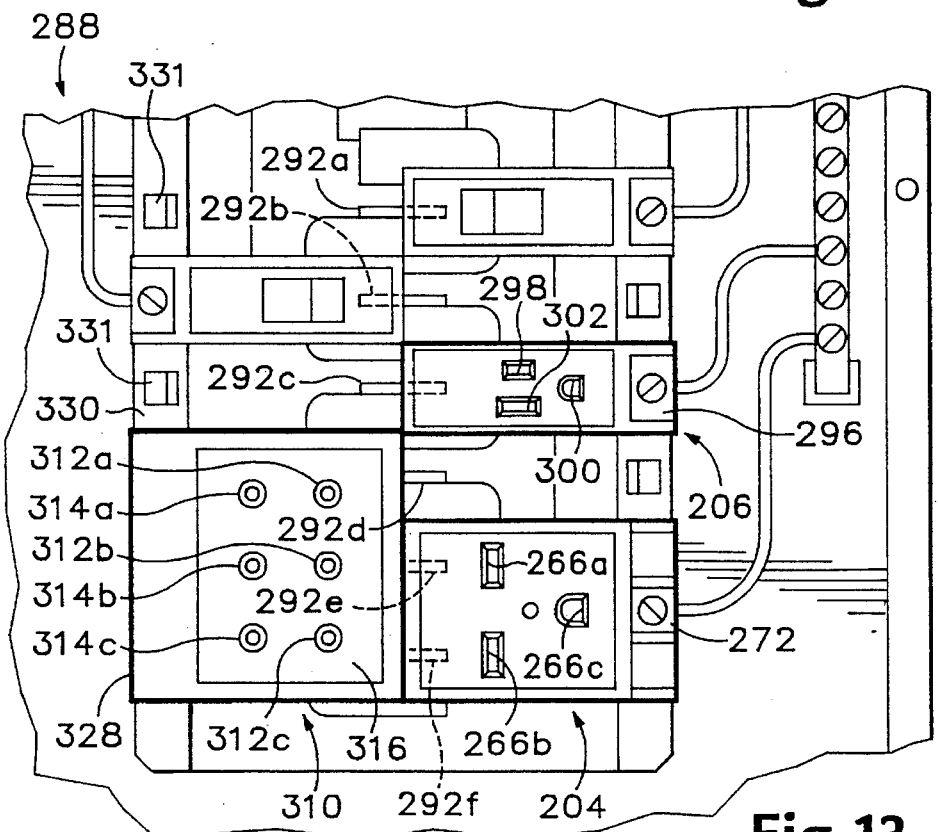
FIG. 13 shows, in heavily darkened lines, the second alternative embodiment of the receptacle, a third alternative embodiment which is a lower voltage version of the second embodiment, and a fourth alternative embodiment of the receptacle suitable for casualty power connections, where each receptacle is shown in installed position on a conventional service panel.

A second alternative embodiment 204 of the receptacle is shown in FIGS. 10, 11 and 13. This second alternative receptacle includes an upper casing 262 and a lower casing 264 that are equivalent to the upper casing 208 and the lower casing 210, respectively, of the first alternative receptacle 202. Hence, the second alternative receptacle is suitably configured to engage the respective prongs of the type of standard power cord 28 shown in FIG. 1. In particular, the respective prongs 24a, 24b and 24c of the power cord are insertable through corresponding openings 266a, 266b and 266c that are formed in the upper casing 262 for respective engagement with a right-hand upper spring contact 268a, a left-hand upper spring contact 268b and a rearward upper spring contact 270 that are provided on the receptacle. The rearward upper spring contact 270 is connected to a rear contact 272 by a rigid conductive strap 274 in the same manner as equivalent components on the exemplary receptacle 20. However, the second alternative receptacle 204 differs from the exemplary receptacle 20 in that its right- and left-hand upper spring contacts are not interconnected with the corresponding right- and left-hand lower spring contacts 276a and 276b by an interconnection circuit including an overload protection mechanism. Instead, each upper spring contact is electrically connected directly to the corresponding lower spring contact by being mounted on a horizontal lug 278a or 278b that rearwardly extends from the back of the corresponding lower spring contact. As with the exemplary receptacle 20, then, the lower spring contacts 276a and 276b are not only involved in mounting the receptacle but also are involved in establishing direct electrical connection between the receptacle and the blades (such as 120e and 120f) of the selected service panel or box. Referring also to FIG. 10, the attachment mechanism 282 on the rear end 284 of the receptacle includes a pair of lip members 286a and 286b for mounting the receptacle by quick plug-in action on the selected service panel or box in the pivoting manner already described above.

Referring to FIG. 11, because the upper spring contacts 268a and 268b are directly connected electrically to the lower spring contacts 276a and 276b without any overload protection devices being interconnected therebetween, it is preferable that the second alternative receptacle 204 be limited to use at those locations where there is already some type of overload protection mechanism in place. Thus, referring to FIG. 13, it would be appropriate to mount the second alternative receptacle on a branch service panel 288 as opposed to a main service panel. In FIG. 13, it will be understood that power terminals 292a, 292c and 292e are supplied with positive phase power through a first supply line, such as in 290a in FIG. 4, that is connected at one end (not shown) to the branch service panel 288 and that is connected at the other end to the positive supply of the main service panel through a first circuit breaker module, such as module 118a. Similarly, power terminals 292b, 292d and 292f are supplied with negative phase power through a second supply line, such as line 290b in FIG. 4, that is connected at one end (not shown) to the branch service panel 288 and that is connected at the other end to the negative supply of the main service panel through a second circuit breaker module, such as module 118b. In accordance with this particular setup, if connection of a power cord to the receptacle 204 begins to result in too much current being drawn, the first and second circuit breaker modules back at the main service panel will automatically trip, thereby protecting the receptacle and its surrounding connections.

It will be recognized that the various embodiments 20, 202 and 204 of the receptacle which have hereinabove been described can be modified as to their construction in order to meet the particular needs of the system user without departing from the broader principles of the present invention. For example, in FIG. 13, a third alternative embodiment 206 (120 V,15 A) of the receptacle is shown that is suitably configured for connection to a one-pole, three-wire standard power cord of the type in which just one wire carries power and the other two wires are for ground and neutral connections. Within the third alternative receptacle, electrical interconnection is made between the rear contact 296 and a pair of upper spring contacts, where each upper spring contact underlies a corresponding one of the openings 300 and 302. Underlying the opening 298 is another upper spring contact that is electrically interconnected with a lower spring contact to enable the receptacle to directly connect electrically to a selected panel blade, such as 292c.

Also shown in FIG. 13 is a fourth alternative embodiment 310 of the receptacle. In the following description of the operation of this particular form of the receptacle, it is assumed that the line connections to the service panel 288 are such that the power terminals of this panel normally provide three phase power, that is, terminals 292a and 292d provide a first phase of power, terminals 292b and 292e provide a second phase and terminals 292c and 292f provide a third phase. The purpose of receptacle 310 is to provide a three-phase casualty connection so that if the service panel 288 should lose power, all three phases of power will be restored to the panel through the receptacle. In order to perform this function, the receptacle 310 is connected to a backup service panel via an electrical cable, which cable is terminated, at one end, by three pins, for plug-in connection into either a first bank of openings 312a, 312b and 312c or a second bank of openings 314a, 314b and 314c formed on the upper face 316 of the receptacle. In this manner, each pin is electrically connected to a corresponding one of the power terminals, that is, the respective pin inserted into either opening 312a or 314a is electrically connected to power terminal 292d, the pin inserted into either opening 312b or 314b is electrically connected to power terminal 292e, and the pin inserted into either opening 312c or 314c is electrically connected to power terminal 292f. These connections are established via three connector assemblies which are mounted inside the receptacle 310, where each connector assembly 318 is constructed as shown in FIG. 14.

Figure 14:
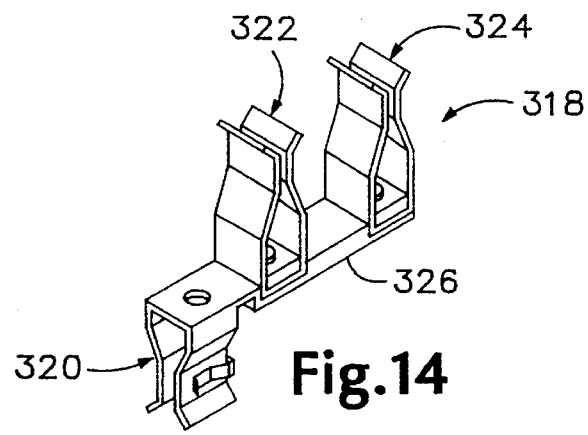
FIG. 14 is a perspective view of one of the three connector assemblies mounted inside the fourth alternative embodiment of the receptacle.

As depicted in FIG. 14, each connector assembly 318 includes a lower spring contact 320 that is interconnected electrically with a pair of upper spring contacts 322 and 324, where these upper spring contacts are each fastened by a respective screw to a horizontal lug 326 that rearwardly extends from the back of the lower spring contact. It may be noted that each connector assembly, except for having a pair of upper spring contacts, is similar in construction to the forward connector assemblies for the second alternative form of receptacle 204 shown in FIG. 11, and the internal compartments of the receptacle 310 in which the connector assembly 318 is mounted correspond to those shown in FIG. 11.

The rear end 328 of the receptacle includes three separate lip members (not shown) each formed in the same manner as lip member 286a or 286b shown in FIG. 10. Accordingly, the rear end of the receptacle is engaged to the mounting support 330 of the service panel 288 by inserting the lip members underneath selected ones of the hook-like retaining tabs 331 on the support while the receptacle is being held at an angle of tilt relative to the panel and by pivoting the rear end of the receptacle about the tabs, which causes the lower spring contact 320 of each connector assembly 318 to rotate into plug-in engagement with a corresponding one of the power terminals. In this manner, the casualty power receptacle 310, like the other receptacles that are described above, is quickly installed on the panel without any need, for example, to employ further fastening elements, such as screws, to keep the receptacle securely mounted on the support 330. The upper spring contacts 322 and 324 of each connector assembly are arranged so that a respective pin on the interconnecting cable can be inserted into either one of the pair of openings that is aligned with a particular power terminal in order to be connected to that terminal, that is, each connector assembly is arranged in a forward-to-rearward direction with its forward upper spring contact 322 aligned with a forward opening 312a, 312b or 312c and with its rearward upper spring contact 324 aligned with the corresponding rearward opening 314a, 314b or 314c.

Figure 15:
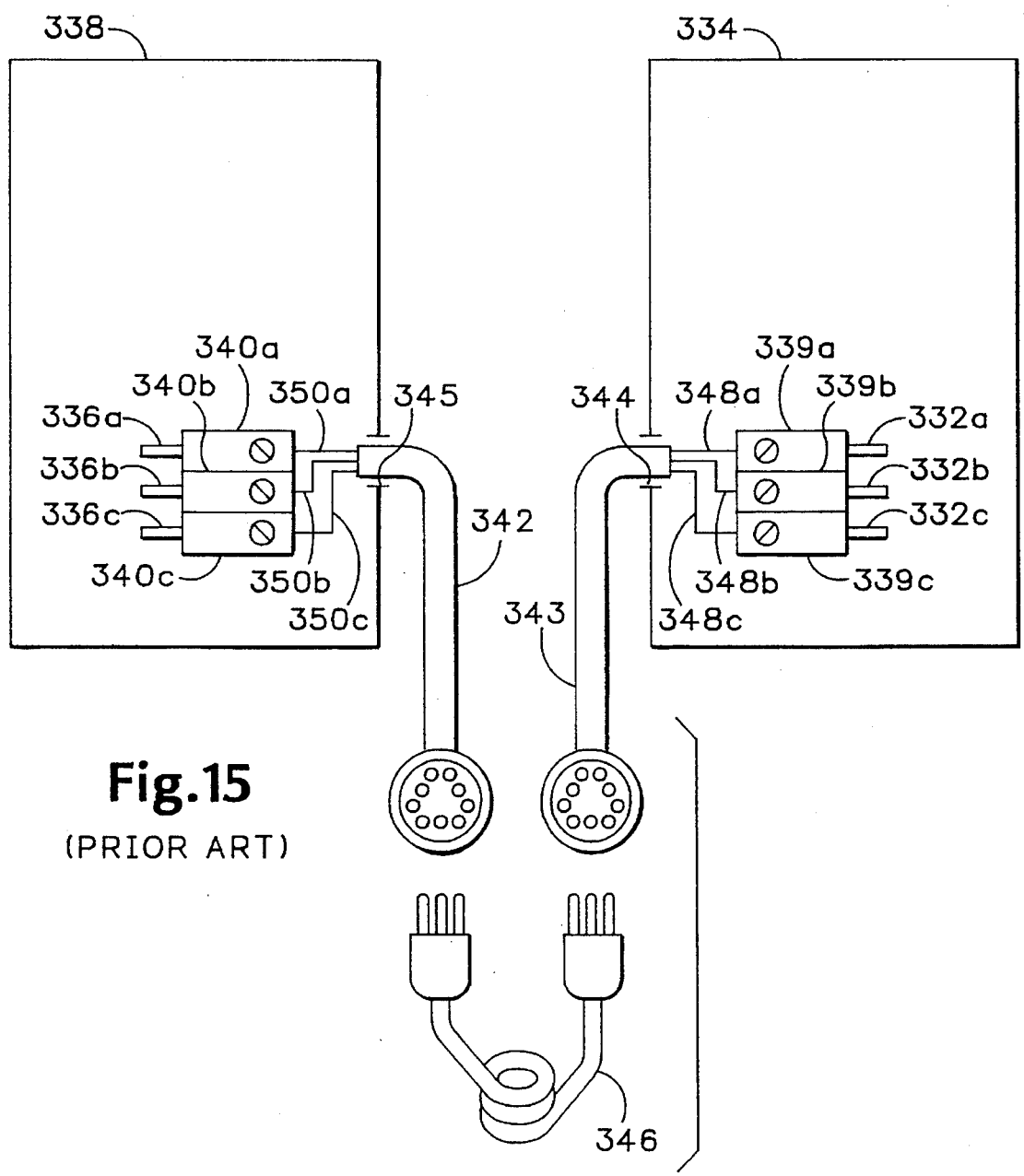
FIG. 15 is a schematic view of a conventional casualty power connection system constructed in accordance with the prior art.

From the foregoing description, it will be recognized that the power terminals of the service panel 288 can, for purposes of power backup, be electrically connected to the corresponding (same phase) power terminals of the backup panel by installing a casualty power receptacle 310 on each panel using the quick plug-in procedure described above and by interconnecting these receptacles using an electrical cable having a three-pin connector at each end. This casualty connection system represents an improvement over conventional casualty connection systems, such of the type schematically depicted in FIG. 15, wherein the power terminals 322a, 332b and 332c of the first service panel 334 are connected to the power terminals 336a, 336b and 336c of the second service panel 338 by six individual circuit breakers 339a–c and 340a–c, by two connection cords 342 and 343 each entering the corresponding panel through a punch-out hole 344 or 345 in the panel and by an electrical cable 346 having a three-pin head at each end. Under the conventional approach, in particular, more time is required for installation of the casualty system since each separate phase line 348a–c and 350a–c of each connection cable needs to be separately connected to a corresponding circuit breaker including by individually tightening a set screw on each breaker to secure the stripped end of the corresponding phase line to the breaker. Conversely, the conventional casualty system takes longer to remove if it becomes necessary to open additional space on each panel for making additional branch corrections to the panel.

Other possible variations in the construction of the receptacle will be readily apparent to those of ordinary skill in the art. It will further be noted that a receptacle of the type hereinabove described can be mounted within various ordinary types of electrical boxes even in the absence, for example, of a full-size mounting bracket, provided that at least one retaining tab and power terminal are provided within the box in suitable configuration for mounting a conventional circuit breaker module.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for adapting a power distribution panel for electrical connection with a power cord, said power cord including at least first and second prongs, said power distribution panel having at least one power terminal through which said panel supplies electrical power and a mounting support on which at least one circuit breaker module of standard length can be selectively mounted by pivoting movement of a rearward end of said module about a hook-like retaining tab included on said support so as to rotate a conductive element included adjacent a forward end of said module into plug-in engagement with said power terminal, said system comprising:

(a) an electrical receptacle including an outer housing and a plurality of conductive elements included within said housing for enabling said receptacle to establish electrical connection between said panel and said power cord, said housing having an upper face, a lower face, a front end, a rear end and a pair of sides, said elements including at least first and second upper contacts disposed in alignment with at least first and second openings formed in said upper face such that said first and second prongs are insertable into said first and second openings for engagement with said first and second upper contacts, respectively;

(b) a mounting mechanism on said receptacle, said mounting mechanism including a lower contact disposed along said lower face of said receptacle adjacent said front end in suitable orientation for plug-in engagement with said power terminal; and (c) said mounting mechanism being configured so that said receptacle is mountable on said panel in substitution for said circuit breaker module of standard length and including attachment means adjacent said rear end for engaging said hook-like retaining tab and for keeping said rear end and said hook-like retaining tab inseparably attached to each other in direct response to plug-in engagement between said lower contact and said power terminal.

2. The system of claim 1 wherein said receptacle includes a rear contact electrically interconnected to said second upper contact and so disposed as to be accessible from said rear end for electrical interconnection, via a cable, with a grounding bus arbitrarily located on said panel in relation to said power terminal.

3. The system of claim 1 wherein said electrical receptacle constitutes a first electrical receptacle and further including a second electrical receptacle of equivalent construction to said first electrical receptacle and a casualty power cord having a pair of ends each including at least first and second prongs so configured that said first and second prongs of one of said ends is able to directly engage said first and second upper contacts, respectively, of said first electrical receptacle and said first and second prongs of the other of said ends is able to directly engage said first and second upper contacts, respectively, of said second electrical receptacle.

4. The system of claim 1 wherein said first upper contact and said lower contact are interconnected electrically.

5. The system of claim 1 wherein said attachment means includes a lip member.

6. The system of claim 1 wherein said lower contact is of female-type.

7. The system of claim 1 wherein said lower contact includes a spring-biased pair of jaws.

8. The system of claim 1 wherein said receptacle is adapted for connection with said power cord when said first and second prongs are of nonlocking type.

9. The system of claim 1 wherein said receptacle includes overload protection means for enabling said panel and said power cord to be automatically disconnected electrically if the level of current passing through said receptacle between said panel and said power cord exceeds a predetermined tolerance rating.

10. The system of claim 9 wherein said overload protection means includes a rear contact electrically interconnected to said first upper contact and so disposed as to be accessible from said rear end for electrical interconnection, via a cable, with the load terminal of a circuit breaker module.

11. The system of claim 9 wherein said first upper contact and said lower contact are interconnected electrically by an interconnection circuit located within said housing, said interconnection circuit including said overload protection means.

12. The system of claim 11 wherein said interconnection circuit includes respective means upper and lower portions extending one above the other.

13. A method for adapting a power distribution panel for electrical connection with a power cord, said power cord including at least first and second prongs, said power distribution panel having at least one power terminal through which said panel supplies electrical power and a mounting support on which at least one circuit breaker module of standard length can be selectively mounted by pivoting movement of a rearward end of said module about a hook-like retaining tab included on said support so as to rotate a conductive element included adjacent a forward end of said module into plug-in engagement with said power terminal, said method comprising:

(a) providing an electrical receptacle including an outer housing and a plurality of conductive elements within said housing, said housing having an upper face, a lower face, a front end, a rear end and a pair of sides, said elements including at least first and second upper contacts disposed in alignment with at least first and second openings formed in said upper face such that said first and second prongs are insertable into said first and second openings for engagement with said first and second upper contacts, respectively;

(b) providing a mounting mechanism on said receptacle, said mounting mechanism including a lower contact disposed along the lower face of said receptacle adjacent said front end in suitable orientation for plug-in engagement with said power terminal and further including a lip member on said rear end; and (c) adapting said panel for electrical connection to said power cord including the step of directly mounting said receptacle on said panel by inserting said lip member beneath said retaining tab and then pivoting said lip member about said retaining tab so as to cause said lower contact to rotate into plug-in engagement with said power terminal.

14. The method of claim 13 further including mounting said receptacle on said panel in substitution for said circuit breaker module of standard length.

15. The method of claim 13 including electrically connecting said first prong and a load terminal of a circuit breaker module as a result of inserting said first prong into engagement with said first upper contact.

16. The method of claim 15 further including providing a rear contact electrically interconnected to said first upper contact and disposed adjacent said rear end and, in preparation for electrically connecting said first prong and said load terminal, interconnecting via a conductive cable said load terminal and said rear contact.

17. The method of claim 13 further including providing an overload protection mechanism disconnecting said panel and said power cord if the level of current passing through said receptacle between said panel and said power cord exceeds a predetermined tolerance rating.

18. The method of claim 17 further including resetting said overload protection mechanism after said panel and said power cord have been automatically disconnected electrically by said mechanism so that said overload protection mechanism is again operative for use.

19. The method of claim 13 further including electrically connecting said power cord and said panel by inserting said first and second prongs through said first and second openings into engagement with said first and second upper contacts.

20. The method of claim 19 including electrically connecting said first prong and said lower contact as a result of inserting said first prong through said first opening into engagement with said first upper contact.

21. The method of claim 19 including electrically connecting said second prong and a grounding bus on said panel as a result of inserting said second prong into engagement with said second upper contact.

22. The method of claim 21 further including providing a rear contact electrically interconnected to said second upper contact and disposed adjacent said rear end and, in preparation for electrically connecting said second prong and said grounding bus, interconnecting via a conductive cable said grounding bus and said rear contact.

* * * * *